(12) United States Patent
Winkler et al.

(10) Patent No.: US 11,804,770 B2
(45) Date of Patent: Oct. 31, 2023

(54) ANALYZING A CONTROL SIGNAL IN ORDER TO CONTROL A POWER CONVERTER TO DELIVER ENERGY TO A LOAD

(71) Applicant: Infineon Technologies AG, Neubiberg (DE)

(72) Inventors: Markus Winkler, Munich (DE); Marco Bachhuber, Neuried (DE); Marcus Nuebling, Olching-Esting (DE); Matthias Weinmann, Munich (DE)

(73) Assignee: Infineon Technologies AG, Neubiberg (DE)

( * ) Notice: Subject to any disclaimer, the term of this patent is extended or adjusted under 35 U.S.C. 154(b) by 204 days.

(21) Appl. No.: 17/495,600

(22) Filed: Oct. 6, 2021

(65) Prior Publication Data

US 2023/0109267 A1 Apr. 6, 2023

(51) Int. Cl.
*H02M 3/335* (2006.01)
*H02M 1/08* (2006.01)
*H02M 1/00* (2006.01)

(52) U.S. Cl.
CPC ........... *H02M 1/08* (2013.01); *H02M 1/0032* (2021.05); *H02M 3/33569* (2013.01)

(58) Field of Classification Search
CPC .. H02M 1/08; H02M 1/0032; H02M 3/33569; H02M 1/0019; H02M 1/32
See application file for complete search history.

(56) References Cited

U.S. PATENT DOCUMENTS

| 5,952,849 | A | 9/1999 | Haigh |
| 6,873,065 | B2 | 3/2005 | Haigh et al. |
| 7,075,329 | B2 | 7/2006 | Chen et al. |
| 10,715,039 | B1* | 7/2020 | Ilango ................... G01R 19/175 |
| 2017/0250612 | A1* | 8/2017 | Malinin ............ H02M 3/33507 |
| 2019/0222125 | A1* | 7/2019 | Schaemann .......... H05B 45/327 |

(Continued)

OTHER PUBLICATIONS

Analog Devices, "High Voltage, Isolated IGBT Gate Driver with Isolated Flyback Controller," ADuM4138, Rev. A, Dec. 2018, 24 pp.

(Continued)

*Primary Examiner* — Kyle J Moody
(74) *Attorney, Agent, or Firm* — Shumaker & Sieffert, P.A.

(57) ABSTRACT

An example a circuit for controlling a power converter comprises a first power domain circuit including a first control circuit and a first driver circuit, wherein the first control circuit controls the first driver circuit to drive a first semiconductor device, wherein a second power domain circuit includes a second control circuit and a second driver circuit. The first control circuit is configured to receive a control signal for controlling the second driver circuit to drive a second semiconductor device; and identify, based on the control signal, a future electrical characteristic of a second power domain output of the power converter. Additionally, the first control circuit is configured to determine, based on the future electrical characteristic of the second power domain output of the power converter, whether to adjust one or more control parameters for controlling the first driver circuit to drive the first semiconductor device.

20 Claims, 8 Drawing Sheets

(56) References Cited

U.S. PATENT DOCUMENTS

2021/0384813 A1* 12/2021 Jain .................. H02M 3/33571
2022/0200461 A1* 6/2022 Winkler ............. H02M 1/0032

OTHER PUBLICATIONS

AVAGO Technologies, "Automotive 2.5 Amp Gate Drive Optocoupler with Integrated Flyback Controller for Isolated DC-DC Converter, Integrated IGBT Desat Overcurrent Sensing, Miller Current Clamping and UVLO Feedback," ACPL-32JT, Jan. 20, 2014, 19 pp.
ROHM Semiconductor, "1ch Gate Driver Providing Galvanic Isolation, 2500Vrms Isolation Voltage," BM60056FV-C, Rev. 001, Jun. 20, 2018, 48 pp.
ROHM Semiconductor, "Optocoupler-less Isolated Flyback Converter," BD7F100HFN-LB BD7F100EFJ-LB, Rev 003, Apr. 17, 2017, 31 pp.
Texas Instrument, "LM5180-Q1 65-VIN PSR Flyback DC/DC Converter with 100-V, 1.5-A Integrated MOSFET," LM5180-Q1, Revised Apr. 2019, 42 pp.
U.S. Appl. No. 17/130,330, filed Dec. 22, 2021, naming inventors Winkler et al.

* cited by examiner

ANALYZING A CONTROL SIGNAL IN ORDER TO CONTROL A POWER CONVERTER TO DELIVER ENERGY TO A LOAD

TECHNICAL FIELD

This disclosure relates to power converters.

BACKGROUND

In power converters it may be desirable to communicate signals from the secondary side to the primary side. Some types of communication may include synchronizing primary and secondary switch timing and communicating changes in load power demand. Some example techniques to communicate between the secondary and primary may include a separate communication channel, which may require isolation. For example, an optoisolator may be a component of a separate communication channel between a secondary side and a primary side of a power converter, with galvanic isolation. Other examples may require additional components in order to modulate existing signals that are already occurring in the power converter, such as by modulating a ringing frequency.

SUMMARY

In general, the disclosure describes one or more techniques for controlling a power converter. A power converter may include a first side and a second side separated by an isolation barrier. A first power domain circuit may be connected to a first semiconductor device on the first side of the power converter and a second power domain circuit may be connected to a second semiconductor device on the second side of the power converter. The first power domain circuit and the second power domain circuit may communicate across the isolation barrier to exchange information for controlling the first semiconductor device and/or the second semiconductor device. In some examples, the first power domain circuit may receive a control signal for use by the second power domain circuit to control the second semiconductor device. The first power domain circuit may send the control signal across the isolation barrier, and the second power domain circuit may control the second semiconductor device based on the control signal. By controlling the second semiconductor device, the second power domain circuit may control size of a load connected to the second semiconductor device.

The techniques of the disclosure may provide specific improvements to the field of power converters that have practical applications. For example, before sending the control signal to the second power domain circuit, the first power domain circuit may determine an electrical characteristic of the control signal that may affect a way in which the second power domain circuit controls the second semiconductor device and controls the size of the load. This means that the first power domain circuit may determine one or more future characteristics of the load based on the electrical characteristic of the control signal. The first power domain circuit may control the first semiconductor device based on the determined future characteristics of the load so that the first side of the power converter supplies an appropriate amount of power to the second side of the power converter. Determining the future characteristics of the load may allow the first power domain circuit to compensate for load changes faster than systems that do not determine future characteristics of a load based on a control signal.

In one example, a circuit for controlling a power converter, the circuit includes a first power domain circuit including a first control circuit and a first driver circuit, wherein the first control circuit controls the first driver circuit to drive a first semiconductor device of the power converter, wherein a second power domain circuit includes a second control circuit and a second driver circuit, wherein the first power domain circuit is isolated from the second power domain circuit. The first power domain circuit is configured to receive a control signal for controlling the second driver circuit to drive a second semiconductor device of the power converter; identify, based on the control signal, a future electrical characteristic of a second power domain output of the power converter; and determine, based on the future electrical characteristic of the second power domain output of the power converter, whether to adjust one or more control parameters for controlling the first driver circuit to drive the first semiconductor device.

In another example, a method includes receiving, by a first control circuit of a first power domain circuit, a control signal for controlling a second driver circuit of a second power domain circuit to drive a second semiconductor device of the power converter, wherein the first control circuit controls a first driver circuit of the first power domain circuit to drive a first semiconductor device of the power converter, wherein the second power domain circuit includes a second control circuit, and wherein the first power domain circuit is isolated from the second power domain circuit. Additionally, the method includes identifying, by the first control circuit based on the control signal, a future electrical characteristic of a second power domain output of the power converter; and determining, by the first control circuit based on the future electrical characteristic of the second power domain output of the power converter, whether to adjust one or more control parameters for controlling the first driver circuit to drive the first semiconductor device.

In another example, a system comprising: a power converter; and a circuit for controlling the power converter. The circuit includes a first power domain circuit including a first control circuit and a first driver circuit, wherein the first control circuit controls the first driver circuit to drive a first semiconductor device of the power converter, wherein a second power domain circuit includes a second control circuit and a second driver circuit, wherein the first power domain circuit is isolated from the second power domain circuit. The first power domain circuit is configured to receive a control signal for controlling the second driver circuit to drive a second semiconductor device of the power converter; identify, based on the control signal, a future electrical characteristic of a second power domain output of the power converter; and determine, based on the future electrical characteristic of the second power domain output of the power converter, whether to adjust one or more control parameters for controlling the first driver circuit to drive the first semiconductor device.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
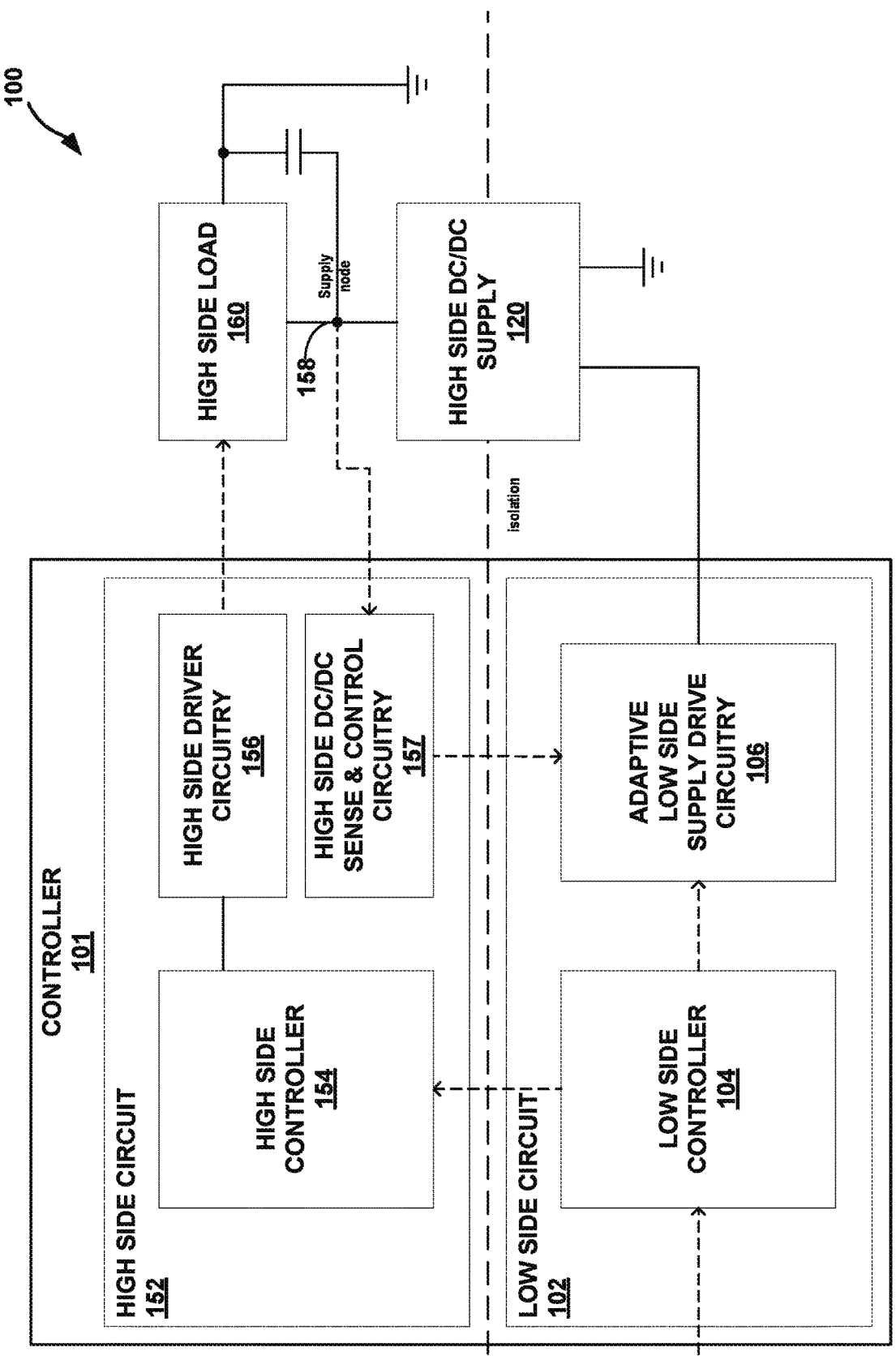
FIG. 1 is a block diagram illustrating a first example power converter system including controller for a power converter, in accordance with one or more techniques of the disclosure.

Some systems may use a power converter to control energy supplied to a load. This disclosure describes control techniques for controlling a first power domain circuit and a second power domain circuit in order to control an energy output from the power converter to the load. In some examples, the power converter may include a first side isolated from a second side. The load may be connected on the second side of the power converter, and the load may receive power from the first side of the power converter. The first power domain circuit may drive a first semiconductor device in order to control an amount of power that the first side of the power converter delivers to the load. Furthermore, the second power domain circuit may drive a second semiconductor device in order to control a size of the load. It may be beneficial for the first side of the power converter to deliver a correct amount of energy to the second side based on a size of the load. One or more techniques of this disclosure include predicting a future size of the load based on a control signal, and adjusting the amount of power that the first side of the power converter delivers to the load based on the predicted future size of the load FIG. 1 is a block diagram illustrating a first example power converter system 100 including a low side and a high side separated by semiconductor junctions, in accordance with one or more techniques of the disclosure. Power converter system 100 includes a controller 101 for controlling a power converter. Power converter system 100 comprises a direct current-to-direct current (DC/DC) converter including a high side DC/DC supply 120. Power converter system 100 provides the advantage of isolation between a low side (sometimes referred to herein as the "primary side") and a high side (sometimes referred to herein as the "secondary side"). As seen in FIG. 1, low side circuit 102 controls high side DC/DC supply 120 to deliver energy to high side load 160. High side circuit 152 controls one or more electrical characteristics of high side load 150.

Power converter system 100 includes controller 101, high side DC/DC Supply 120, and high side load 160. Controller 101 controls the operation of power converter system 100 and comprises low side circuit 102 and high side circuit 152. Low side circuit 102 and high side circuit 152 are separated by semiconductor junctions. High side DC/DC supply may bridge the semiconductor junctions so that low side circuit 102 is configured to control the high side DC/DC supply 120 to deliver energy to the high side load 160 across the semiconductor junctions. High side load 160 is connected to high side DC/DC supply 120. Furthermore, high side circuit 152 controls one or more electrical characteristics of the high side load 160. These electrical characteristics of high side load 160 may determine an amount of energy that high side load 160 needs to receive from the low side of the power converter. For example, when a voltage of high side load 160 is large, high side load 160 may require a large amount of energy from the low side. When the voltage of high side load 160 is small, high side load 160 may require a small amount of energy from the low side. High side load 160 is typically a high-voltage application.

Low side circuit 102 comprises low side controller 104 and adaptive low side supply drive circuitry 106. Low side controller 104 may control the adaptive low side supply drive circuitry 106 to drive the high side DC/DC supply 120. The high side DC/DC supply 120 delivers energy to the high side load 160 over the semiconductor juncitons. In some examples, low side controller 104 may receive a control signal for high side circuit 152. Low side controller 104 may process the control signal and deliver the control signal to high side circuit 152. Based on processing the control signal, low side controller 104 may identify one or more future electrical characteristics of the high side load 160, and transmit these future electrical characteristics to adaptive low side supply drive circuitry 106. Additionally, or alternatively, adaptive low side supply drive circuitry 106 may receive one or more signals from high side circuit 152. Adaptive low side supply drive circuitry 106 may determine, based on the future electrical characteristic of the high side load 160 and the signals received from the high side circuit 152, whether to adjust one or more control signals for controlling the high side DC/DC supply 120 to deliver energy to the high side load 160.

High side circuit 152 of controller 101 comprises high side controller 154, high side driver circuitry 156, and high side DC/DC sense & control circuitry 157. High side controller 154 may receive a control signal from low side controller 104. The control signal may include one or more electrical characteristics for controlling high side driver circuitry 156 to drive a semiconductor device connected to high side load 160. This means that high side driver circuitry 156 may control one or more electrical characteristics of the high side load 160 based on the control signal. High side DC/DC sense & control circuitry 157 may sense one or more electrical characteristics of node 158. For example, high side DC/DC sense & control circuitry 157 may sense a voltage at node 158. Node 158 is connected to high side load 160. In some examples, high side driver circuitry 156 may control the voltage at node 158 based on the control signal received from low side controller 104. High side DC/DC sense & control circuitry 157 may send feedback information based on the sensed electrical characteristic of node 158 over the semiconductor junctions to adaptive low side supply drive circuitry 106. In some examples, a semiconductor die comprises low side circuit 102 high side circuit 152. The semiconductor die may include one or more semiconductor junctions that separate low side circuit 102 from high side circuit.

In accordance with the techniques of the disclosure, power converter system 100 implements a communication scheme between low side circuit 102 and high side circuit 152 that enables controller 101 to efficiently control high side DC/DC supply 120 to provide a correct amount of energy to the high side load 160. As described herein, low side controller 104 may receive a control signal for controlling high side driver circuitry 156 to drive a semiconductor device connected to high side load 160. Low side controller 104 may process the control signal in order to determine one or more electrical characteristics of the control signal. These electrical characteristics of the control signal may indicate future electrical characteristics of high side load 160. For example, the electrical characteristics of the control signal may indicate a future voltage at node 158 that is connected to high side load 160. High side DC/DC sense & control circuitry 157 senses a present electrical characteristic, such as a voltage or a current, of node 158 which is connected to high side load 160. High side DC/DC sense & control circuitry 157 may send this present electrical characteristic of node 158 to adaptive low side supply drive circuitry 106. Furthermore, low side controller 104 may send the predicted future electrical characteristic of node 158 to adaptive low side supply drive circuitry 106. Adaptive low side supply drive circuitry 106 may determine, based on the present electrical characteristic of node 158 and the predicted future electrical characteristic of node 158, whether to adjust one or more control parameters for controlling high side DC/DC supply 120 to provide power to high side load 160.

The techniques of the disclosure may provide specific improvements to the field of power converters e.g., flyback converters) that have practical applications. For example, by predicting a future electrical characteristic of node 158 based on the control signal, low side circuit 102 may adapt to changes in the electrical characteristic of node 158 quicker as compared with systems that do not predict a future electrical characteristic of a load. For example, when the electrical characteristic of node 158 increases or decreases, it may be beneficial to adjust one or more control parameters for controlling high side DC/SC supply 120 in order to compensate for the change. Predicting a future change in the electrical characteristic of node 158 may allow controller 101 to quickly adapt for this change.

Figure 2:
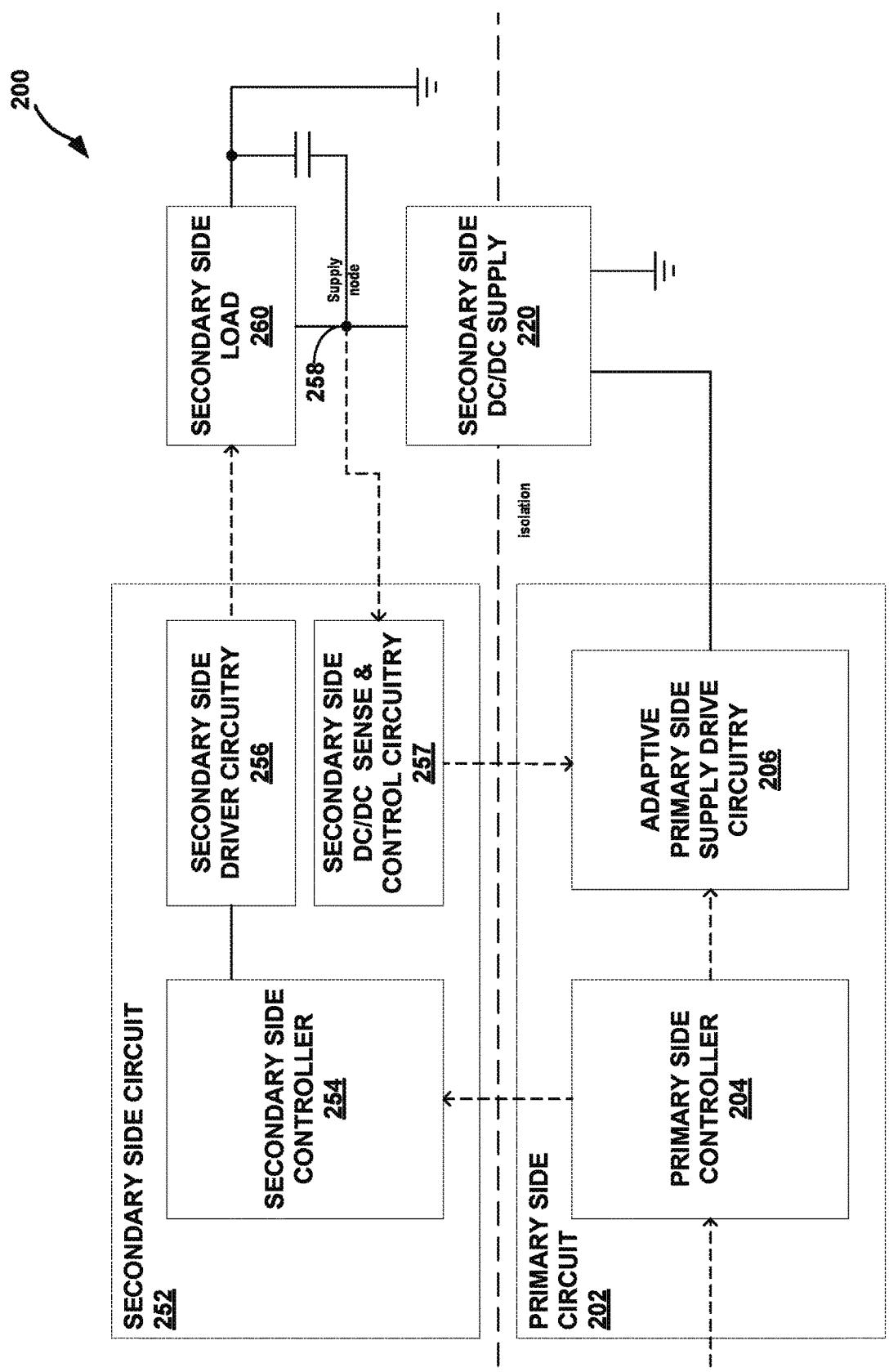
FIG. 2 is a block diagram illustrating a second example power converter system including a controller for a power converter, in accordance with one or more techniques of the disclosure.

FIG. 2 is a block diagram illustrating a second example power converter system 200 including a primary side and a secondary side separated by a galvanic isolation barrier, in accordance with one or more techniques of the disclosure. In some examples, power converter system 200 is substantially the same as power converter system 100, except that power converter system 200 includes a "primary side" and a "secondary side" separated by a galvanic isolation barrier instead of the "low side" and the "high side of FIG. 1 separated by semiconductor junctions.

In some examples, a first semiconductor die comprises primary side circuit 202 and a second semiconductor die different than the first semiconductor die comprises secondary side circuit 252. In some examples, a communication channel connecting primary side side controller 204 and secondary side controller 254 may comprise a high-voltage isolation channel between the first semiconductor die and the second semiconductor die. In some examples, a communication channel connecting high side DC/DC sense & control circuitry 257 and adaptive low side supply drive circuitry 206 may comprise a high-voltage isolation channel between the first semiconductor die and the second semiconductor die. A single package may comprises the first semiconductor die, the second semiconductor die, and the high-voltage isolation channels.

Primary side circuit 202 may be an example of low side circuit 102 of FIG. 1. Primary side controller 204 is an example of low side controller 104 of FIG. 1, Adaptive primary side supply drive circuitry 206 is an example of adaptive low side supply drive circuitry 106 of FIG. 1. Secondary side DC/DC supply 220 is an example of high side DC/DC supply 120 of FIG. 1. Secondary side circuit 252 is an example of high side circuit 151 of FIG. 1. Secondary side controller 254 is an example of high side controller 154 of FIG. 1. Secondary side driver circuitry 256 is an example of high side driver circuitry 156 of FIG. 1. Secondary side DC/DC sense & control circuitry 257 is an example of high side DC/DC sense & control circuitry 157 of FIG. 1. Node 258 is an example of node 158 of FIG. 1. Secondary side load 260 may be an example of high side load 160 of FIG. 1.

Figure 3:
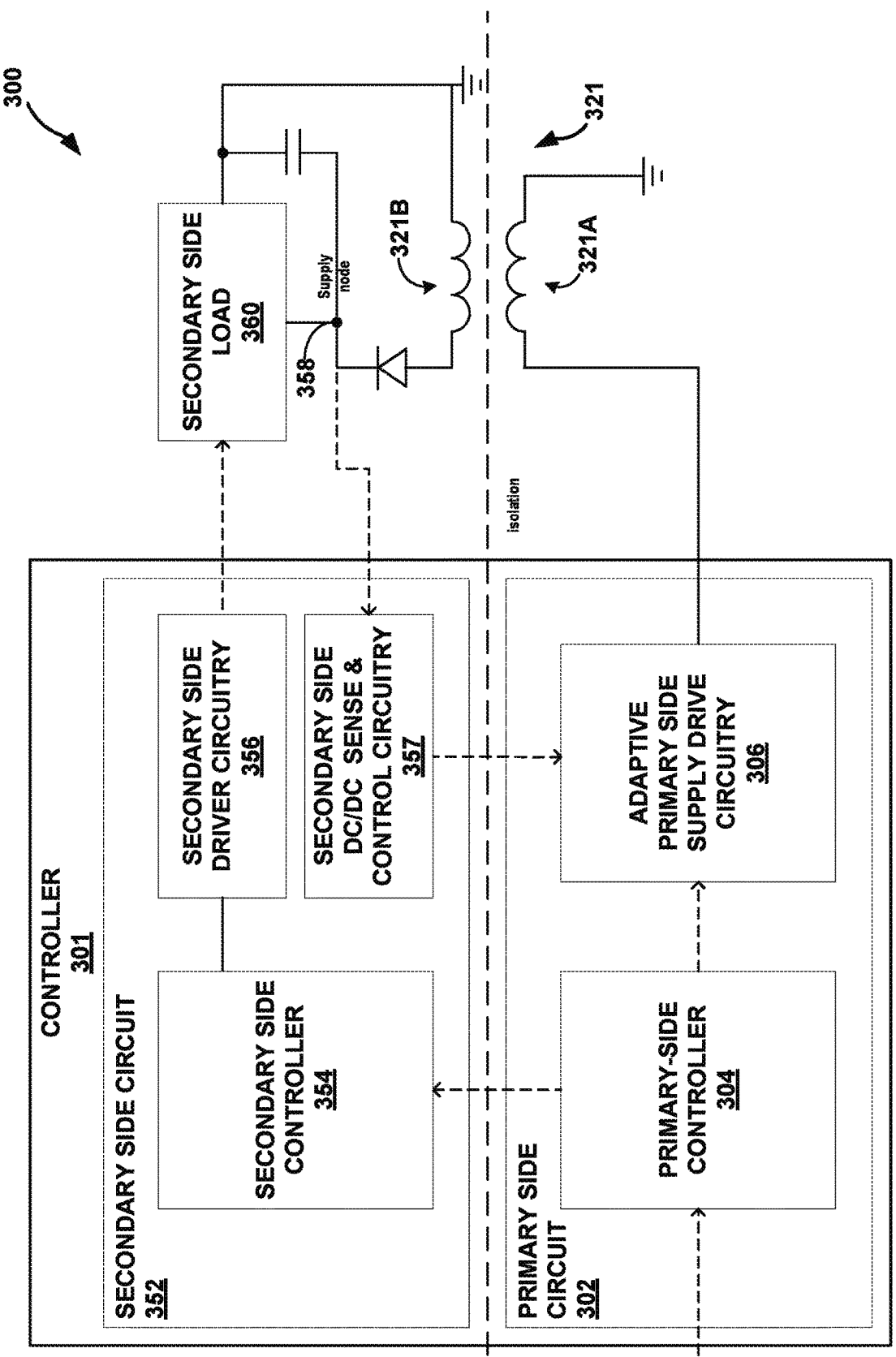
FIG. 3 is a block diagram illustrating a third example power converter system including a controller for a power converter, in accordance with one or more techniques of the disclosure.

FIG. 3 is a block diagram illustrating a third example power converter system 300 including controller 301 for a power converter, in accordance with one or more techniques of the disclosure. Power converter system 300 may represent a flyback power converter system comprising a flyback converter 321 with two coupled windings (e.g., a transformer) which transfer energy from first winding 321A to second winding 321B. Power converter system 300 further provides the additional advantage of isolation between components connected to first winding 321A (referred to herein as the "primary side") and components connected to second winding 321B (referred to herein as the "secondary side"). In some examples, power converter system 300 is a DC-DC flyback converter topology for isolated gate drivers, such as an insulated-gate bipolar transistor (IGBT). In some examples, power converter system 300 may be substantially the same as power converter system 100 of FIG. 1, except that power converter system 300 includes a flyback converter 321 instead of a high side DC/DC supply 120.

In some examples, adaptive primary side supply drive circuitry 306 may control flyback converter 321 to supply power to secondary side load 360, much like adaptive low side supply drive circuitry 106 controls high side DC/DC supply 120 to supply power to high side load 160 in the example of FIG. 1. Adaptive primary side supply drive circuitry 306 may drive flyback converter 321 based on a predicted future electrical characteristic of node 358 received from primary side controller 304 and a present electrical characteristic of node 358 received from secondary side DC/DC sense & control circuitry 357. This allows controller 301 to adjust one or more control parameters in order to account for predicted future changes in a size of the secondary side load 360.

In some examples, power converter system 300 implements an efficient communication scheme between primary side circuit 302 and secondary side circuit 352. As described herein, secondary side DC/DC sense & control circuitry 357 senses an electrical characteristic of node 358. Secondary side DC/DC sense & control circuitry 357 selects, based on the sensed electrical characteristic, a power mode of a plurality of power modes. In some examples, the plurality of power modes includes a low power mode, a high power mode, and a cycle skip power mode. Secondary side DC/DC sense & control circuitry 357 transmits, to adaptive primary side supply drive circuitry 306, a control message specifying the selected power mode. Adaptive primary side supply drive circuitry 306 receives the control message specifying the selected power mode and controls flyback converter 321 according to the selected power mode so as to control a value of the output of the flyback converter 321.

Figure 4:
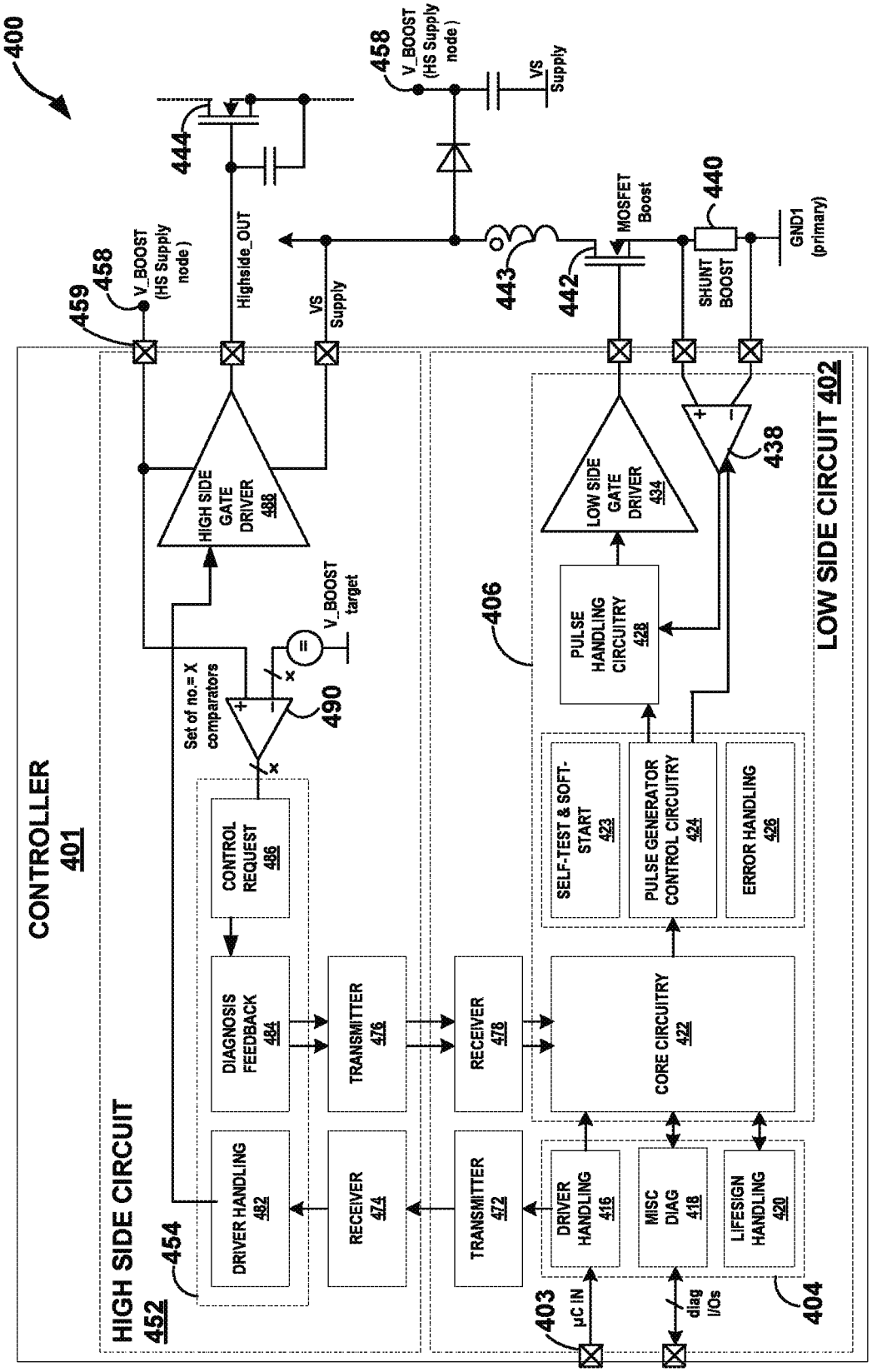
FIG. 4 is a block diagram illustrating an example power converter system in further detail, in accordance with one or more techniques of the disclosure.

FIG. 4 is a block diagram illustrating an example power converter system 400 in further detail, in accordance with one or more techniques of the disclosure. In some examples, power converter system 400 may be an example of power converter system 100 of FIG. 1. In some examples, power converter system 400 may be an example of power converter system 200 of FIG. 2. Controller 401 comprises low side circuit 402 and high side circuit 452. Low side circuit 402 comprises low side controller 404, and adaptive low side supply drive circuitry 406. Low side controller 404 includes driver handling circuitry 416, miscellaneous diagnostics (MISC DIAG) circuitry 418, and life sign handling circuitry 420. Adaptive low side supply drive circuitry 406 includes core circuitry 422, pulse generator control circuitry 424, pulse handling circuitry 428, high side gate driver 488, and comparator 490. High side circuit 452 comprises high side controller 454, high side gate driver 488, and comparator 490.

Low side controller 404 and high side controller 454 may communicate with one another over an isolation barrier. Low side controller 404 may be configured to transmit one or more signals across the isolation barrier to the high side controller 454. For example, transmitter 472 may transmit one or more signals to receiver 474. Additionally, or alternatively, high side circuit 452 may be configured to transmit one or more signals to low side controller 404 over the isolation barrier. For example, transmitter 476 may transmit one or more signals to receivers 478. For example, high side controller 454 may transmit data, such as diagnostic data or flyback power modes, to low side controller 404 over the isolation barrier. In some examples, one or more communication channels over the isolation barrier include an optocoupler, one or more additional transformer windings, a dedicated isolation channel, and the like.

In some examples, low side circuit 402 drives a first semiconductor device 442 and the high side circuit 452 drives a second semiconductor device. First semiconductor device 442 and second semiconductor device 444 may represent semiconductor devices of a power converter. By controlling the semiconductor devices 442, 444, low side circuit 402 and high side circuit 452 may control an amount of power output from the low side of the power converter to the high side of the power converter. In some examples, low side circuit 402 may control a duty cycle and/or a frequency of the first semiconductor device 442 and high side circuit 452 may control a duty cycle and/or a frequency of the second semiconductor device 444.

As seen in FIG. 4, the first semiconductor device may control a power source on a low side of the power converter, and the second semiconductor device 44 may be connected to a load on the high side of the power converter. The power converter may deliver power from the power source on the low side to the load on the high side. The load on the high side of the power converter may demand different amounts of power based on a manner in which high side circuit 452 controls the second semiconductor device 444. For example, if high side circuit 452 adjusts a duty cycle and/or a frequency of the second semiconductor device 444, the load may demand a different amount of power from the power source on the low side of the power converter. Low side circuit 402 may control the first semiconductor device 442 in order to compensate for the change in power demanded by the load. It may be beneficial for low side circuit 402 anticipate load changes as they occur or before they occur so that low side circuit 402 can adjust control of the first semiconductor device 442 quickly. In some examples, one or more electrical characteristics of the node 458 may indicate an amount of power demanded by the load from the low side of the power converter.

In accordance with one or more techniques of this disclosure, low side circuit 402 may receive, via pin 403, a control signal. Although low side circuit 402 receives the control signal, the control signal may be configured to control the high side circuit 452 to drive the second semiconductor device 444. Low side controller 404 may receive the control signal from pin 403. Driver handling circuitry 416 of low side controller 404 may process the control signal in order to identify one or more electrical characteristics of the control signal. The one or more electrical characteristics of the control signal may include one or more voltage values, one or more current values, a target duty cycle value for the second semiconductor device 444, a target frequency value for the second semiconductor device 444, or any combination thereof.

Since low side controller 404 receives the control signal before delivering the control signal to high side circuit 452, the one or more electrical characteristics of the control signal may indicate one or more future electrical characteristics of the node 458 that is connected to the second semiconductor device 444. For instance, when the low side controller 404 delivers the control signal to the high side circuit 452, the high side circuit 452 controls the second semiconductor device 444 based on the electrical characteristics of the control signal. How the high side circuit 452 controls the second semiconductor device 444 determines one or more electrical characteristics of the load connected to the second semiconductor device 444. This means that low side controller 404 can predict one or more future electrical characteristics of the node 458 by processing the control signal prior to delivering the control signal to high side circuit 452. When low side controller 404 determines the one or more future electrical characteristics of the node 458, low side controller 404 may output information indicative of the one or more future electrical characteristics to the core circuitry 422 of adaptive low side supply drive circuitry 406.

In some examples, the control signal received by low side circuit 402 via the pin 403 represents a continuous time function or a discrete time function. This means that the electrical characteristics of the control signal may change as a function of time. In some examples, low side controller 404 may process the control signal in real time as the control signal arrives at the low side circuit 402 and determine the one or more future characteristics of node 458 in real time. Consequently, low side controller 404 may continuously possess information indicative of a future electrical characteristic of the node 458, since the control signal travels through low side controller 404 before the control signal controls high side gate driver 488 to drive the second semiconductor device 444.

Driver handling circuitry 416 is configured to transmit the control signal to transmitter 472. Transmitter 472 may transmit the control signal across the isolation barrier to receiver 474. Receiver 474 may transmit the control signal to driver handling circuitry 482 of the high side controller 454. In some examples, driver handling circuitry 482 is configured to process the control signal in order to determine one or more electrical characteristics of the control signal and output another control signal based on the one or more determined electrical characteristics. In some examples, driver handling circuitry 482 is configured to output the control signal without processing the control signal.

High side gate driver 488 may be configured to receive a control signal from driver handling circuitry 482, the control signal indicating the one or more electrical characteristics of the control signal first received at pin 403. High side gate driver 488 may generate a gate driver signal ("Highside_OUT" on FIG. 4) based on the control signal and output the gate driver signal to a control terminal of the second semiconductor device 444. In some examples, this gate driver signal may cause second semiconductor device 444 to turn off and turn on according to a sequence of consecutive "switching cycles." Each switching cycle may include a phase where the second semiconductor device 444 is turned off and a phase where the second semiconductor device 444 is turned on. The "duty cycle" of a semiconductor device may represent a portion of each switching cycle that the semiconductor device is turned on. For example, a duty cycle of 0.7 means that the "on" phase lasts for 70% of each switching cycle, and the "off" phase lasts for 30% of each switching cycle.

The duty cycle and/or the frequency of second semiconductor device 444 may affect one or more electrical characteristics of the power converter system 400. For example, the duty cycle and/or the frequency of second semiconductor device 444 may affect a voltage at the node 458, which receives power from the power source on the low side of the power converter. The load may be connected to the node 458. Consequently, the voltage at node 458 may indicate an amount of power that the load is demanding from the low side of the power converter. In some examples, decreasing a frequency of second semiconductor device 444 may increase a voltage at node 458, and increasing a frequency of second semiconductor device 444 may decrease a voltage at node 458.

In accordance with one or more techniques of this disclosure, high side controller 454 senses a present electrical characteristic of node 458. For example, high side circuit 452 is connected to node 458 via pin 459. Comparator 490 may receive, from pin 459, the present electrical characteristic of node 458. In some examples, the present electrical characteristic of node 458 may include a present voltage at node 458. Comparator 490 may, in some cases, also receive a signal indicating a target electrical characteristic (e.g., a target voltage) for node 458. Comparator 490 may output a comparison signal that indicates a factor of a difference between the present voltage of node 458 and a target voltage of the node 458. Comparator 490 may output the comparison signal to high side controller 454. High side controller 454 may output the comparison signal to transmitter 476, and transmitter 476 may transmit the comparison signal across the isolation barrier to receiver 478. Receiver 478 may send the comparison signal to the core circuitry 422 of adaptive low side supply drive circuitry 406. Since the comparison signal indicates a factor of a difference between a present electrical characteristic of the node 458 and a target electrical characteristic of the node 458, the present signal may indicate the present electrical characteristic of the node 458.

In some examples, the comparison signal received by core circuitry 422 from the high side controller 454 represents a continuous time function or a discrete time function. This means that the electrical characteristics of the comparison signal may change as a function of time. Consequently, core circuitry 422 may continuously possess information indicative of a present electrical characteristic of the node 458. Low side controller 404 continuously processes the control signal in order to determine the future electrical characteristic of node 458 in real time, and low side controller 404 continuously sends information indicative of the future electrical characteristic of node 458 to core circuitry 422. This means that core circuitry 422 may continuously possess information indicative of the future electrical characteristic of node 458.

Core circuitry 422 may determine, based on one or both of the future electrical characteristic of the node 458 and the present electrical characteristic of the node 458, whether to adjust one or more control signals for controlling the low side gate driver 434 to drive the first semiconductor device 442. In some examples, the one or more future electrical characteristics of the node 458 include a future voltage at node 458, and the present electrical characteristic of the node 458 comprises a present voltage of the node 458. Core circuitry 422 may be configured to control one or more operating parameters of adaptive low side supply drive circuitry 406 in order to drive the first semiconductor device 442. The one or more operating parameters may include a magnitude of a gate driver signal output from the low side gate driver 434 to the first semiconductor device 442 and a frequency of the clock signal output from the low side gate driver 434 to the first semiconductor device 442.

Core circuitry 422 may control adaptive low side supply drive circuitry 406 to drive the first semiconductor device 442. In the example of FIG. 4, adaptive low side supply drive circuitry 406 comprises core circuitry, pulse generator control circuitry 424, pulse handling circuitry 428, low side gate driver 434, and comparator 438. To control other components of adaptive low side supply drive circuitry 406, core circuitry 422 may cause pulse generator control circuitry 424 to output one or more clock pulses according to a clock cycle pulse handling circuitry 428. Pulse handling circuitry 428 may receive the clock pulses, and generate a gate driver signal comprising a duty cycle for driving low side gate driver 434. Subsequently, low side gate driver 434 may output the gate driver signal in order to control first semiconductor device 442 to turn off and turn on according to a sequence of switching cycles. The clock signals output by pulse generator control circuitry may determine a frequency, duty cycle, and amplitude of the gate driver signal output by low side gate driver 434.

Comparator 438 may sense a value of an electrical characteristic of shunt boost 440 (e.g., a voltage or a current) and compare the sensed electrical characteristic of shunt boost 440 to a predetermined electrical characteristic (e.g., a peak current threshold). In response to determining that the sensed value of the electrical characteristic of shunt boost 440 exceeds the predetermined threshold, pulse handling circuitry 428 may disable output of the gate driver signal, thereby disabling the adaptive low side supply drive circuitry 406 for the duration of the clock cycle to transfer the electrical power stored at inductor 443 to a high side of the power converter.

Low side controller 404 includes miscellaneous diagnostics (MISC DIAG) circuitry 418. MISC DIAG circuitry 418 enables controller 401 to output, via diagnostics output pins, diagnostic information to a user. In some examples, life sign handling circuitry 420 of low side controller 404 receives a periodic life sign control message from high side controller 454. In the event that life sign handling circuitry 420 fails to receive a scheduled life sign control message from high side controller 454, life sign handling circuitry 420 determines that a fault exists in a communication channel between low side controller 404 and high side controller 454.

Figure 5:
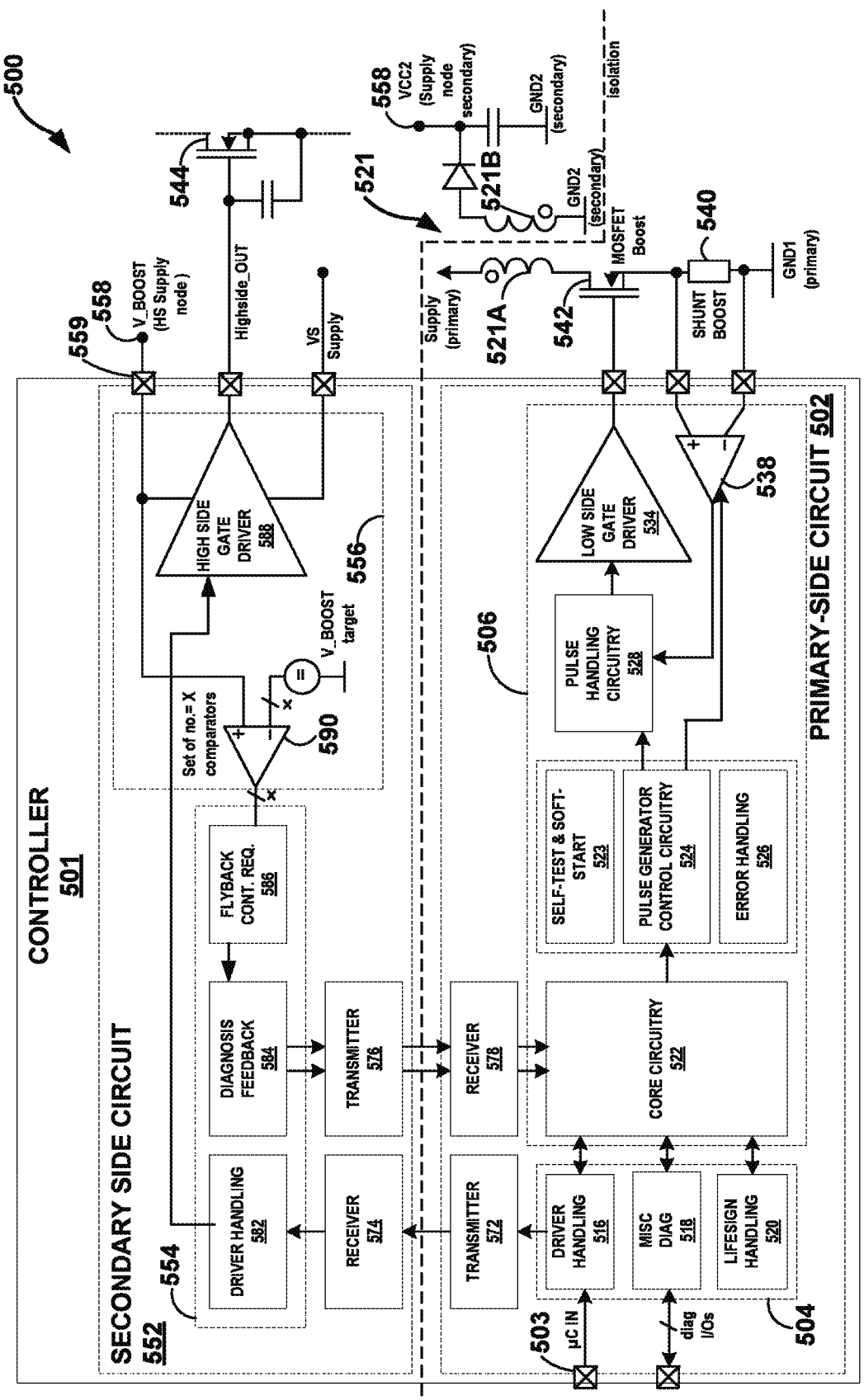
FIG. 5 is a block diagram illustrating an example flyback power converter system in further detail, in accordance with one or more techniques of the disclosure.

FIG. 5 is a block diagram illustrating an example flyback power converter system 500 in further detail, in accordance with one or more techniques of the disclosure. In some examples, flyback power converter system 500 may be an example of power converter system 300 of FIG. 3. Controller 501 comprises primary side circuit 502 and secondary side circuit 552, primary side circuit 502 comprises primary side controller 504, and adaptive primary side supply drive circuitry 506, primary side controller 504 includes driver handling circuitry 516, miscellaneous diagnostics (MISC DIAG) circuitry 518, and life sign handling circuitry 520. Adaptive primary side supply drive circuitry 506 includes core circuitry 522, pulse generator control circuitry 524, pulse handling circuitry 528, secondary side gate driver 588, and comparator 590, secondary side circuit 552 comprises secondary side controller 554, secondary side gate driver 588, and comparator 590. In some examples, flyback power converter system 500 may be substantially the same as power converter system 400 of FIG. 4, except that controller 501 controls a flyback power converter including a buck-boost converter 521, whereas controller 401 controls a DC/DC power converter including inductor 443.

Primary side controller 504 and secondary side controller 554 may communicate with one another over a galvanic isolation barrier, primary side controller 504 may be configured to transmit one or more signals across the galvanic isolation barrier to the secondary side controller 554. For example, transmitter 572 may transmit one or more signals to receiver 574. Additionally, or alternatively, secondary side circuit 552 may be configured to transmit one or more signals to primary side controller 504 over the galvanic isolation barrier. For example, transmitter 576 may transmit one or more signals to receivers 578. For example, secondary side controller 554 may transmit data, such as diagnostic data or flyback power modes, to primary side controller 504 over the galvanic isolation barrier. In some examples, one or more communication channels over the galvanic isolation barrier include an optocoupler, one or more additional transformer windings, a dedicated isolation channel, and the like.

In some examples, primary side circuit 502 drives a first semiconductor device 542 and the secondary side circuit 552 drives a second semiconductor device. First semiconductor device 542 and second semiconductor device 544 may represent semiconductor devices of a power converter. By controlling the semiconductor devices 542, 544, primary side circuit 502 and secondary side circuit 552 may control an amount of power output from the primary side of the power converter to the secondary side of the power converter. In some examples, primary side circuit 502 may control a duty cycle and/or a frequency of the first semiconductor device 542 and secondary side circuit 552 may control a duty cycle of the second semiconductor device 544.

As seen in FIG. 5, the first semiconductor device may control a power source on a primary side of the power converter, and the second semiconductor device 54 may be connected to a load on the secondary side of the power converter. The power converter may deliver power from the power source on the primary side to the load on the secondary side. The load on the secondary side of the power converter may demand different amounts of power based on a manner in which secondary side circuit 552 controls the second semiconductor device 544. For example, if secondary side circuit 552 adjusts a duty cycle of the second semiconductor device 544, the load may demand a different amount of power from the power source on the primary side of the power converter, primary side circuit 502 may control the first semiconductor device 542 in order to compensate for the change in power demanded by the load. It may be beneficial for primary side circuit 502 anticipate load changes as they occur or before they occur so that primary side circuit 502 can adjust control of the first semiconductor device 542 quickly. In some examples, one or more electrical characteristics of the node 558 may indicate an amount of power demanded by the load from the primary side of the power converter.

In accordance with one or more techniques of this disclosure, primary side circuit 502 may receive, via pin 503, a control signal. Although primary side circuit 502 receives the control signal, the control signal may be configured to control the secondary side circuit 552 to drive the second semiconductor device 544, primary side controller 504 may receive the control signal from pin 503. Driver handling circuitry 516 of primary side controller 504 may process the control signal in order to identify one or more electrical characteristics of the control signal. The one or more electrical characteristics of the control signal may include one or more voltage values, one or more current values, a target duty cycle value for the second semiconductor device 544, or any combination thereof.

Since primary side controller 504 receives the control signal before delivering the control signal to secondary side circuit 552, the one or more electrical characteristics of the control signal may indicate one or more future electrical characteristics of the node 558 that is connected to the second semiconductor device 544. For instance, when the primary side controller 504 delivers the control signal to the secondary side circuit 552, the secondary side circuit 552 controls the second semiconductor device 544 based on the electrical characteristics of the control signal. How the secondary side circuit 552 controls the second semiconductor device 544 determines one or more electrical characteristics of the load connected to the second semiconductor device 544. This means that primary side controller 504 can predict one or more future electrical characteristics of the node 558 by processing the control signal prior to delivering the control signal to secondary side circuit 552. When primary side controller 504 determines the one or more future electrical characteristics of the node 558, primary side controller 504 may output information indicative of the one or more future electrical characteristics to the core circuitry 522 of adaptive primary side supply drive circuit 506.

In some examples, the control signal received by primary side circuit 502 via the pin 503 represents a continuous time function or a discrete time function. This means that the electrical characteristics of the control signal may change as a function of time. In some examples, primary side controller 504 may process the control signal in real time as the control signal arrives at the primary side circuit 502 and determine the one or more future characteristics of node 558 in real time. Consequently, primary side controller 504 may continuously possess information indicative of a future electrical characteristic of the node 558, since the control signal travels through primary side controller 504 before the control signal controls secondary side gate driver 588 to drive the second semiconductor device 544.

Driver handling circuitry 516 is configured to transmit the control signal to transmitter 572. Transmitter 572 may transmit the control signal across the galvanic isolation barrier to receiver 574. Receiver 574 may transmit the control signal to driver handling circuitry 582 of the secondary side controller 554. In some examples, driver handling circuitry 582 is configured to process the control signal in order to determine one or more electrical characteristics of the control signal and output another control signal based on the one or more determined electrical characteristics. In some examples, driver handling circuitry 582 is configured to output the control signal without processing the control signal.

Secondary side gate driver 588 may be configured to receive a control signal from driver handling circuitry 582, the control signal indicating the one or more electrical characteristics of the control signal first received at pin 503, secondary side gate driver 588 may generate a gate driver signal ("Highside_OUT" on FIG. 5) based on the control signal and output the gate driver signal to a control terminal of the second semiconductor device 544. In some examples, this gate driver signal may cause second semiconductor device 544 to turn off and turn on according to a sequence of consecutive "switching cycles." Each switching cycle may include a phase where the second semiconductor device 544 is turned off and a phase where the second semiconductor device 544 is turned on. The "duty cycle" of a semiconductor device may represent a portion of each switching cycle that the semiconductor device is turned on. For example, a duty cycle of 0.7 means that the "on" phase lasts for 70% of each switching cycle, and the "off" phase lasts for 30% of each switching cycle.

The duty cycle of second semiconductor device 544 may affect one or more electrical characteristics of the flyback power converter system 500. For example, the duty cycle of second semiconductor device 544 may affect a voltage at the node 558, which receives power from the power source on the primary side of the power converter. The load may be connected to the node 558. Consequently, the voltage at node 558 may indicate an amount of power that the load is demanding from the primary side of the power converter. In some examples, decreasing a duty cycle of second semiconductor device 544 may decrease a voltage at node 558, and increasing a duty cycle of second semiconductor device 544 may increase a voltage at node 558.

In accordance with one or more techniques of this disclosure, secondary side controller 554 senses a present electrical characteristic of node 558. For example, secondary side circuit 552 is connected to node 558 via pin 559, Comparator 590 may receive, from pin 559, the present electrical characteristic of node 558. In some examples, the present electrical characteristic of node 558 may include a present voltage at node 558. Comparator 590 may, in some cases, also receive a signal indicating a target electrical characteristic (e.g., a target voltage) for node 558. Comparator 590 may output a comparison signal that indicates a factor of a difference between the present voltage of node 558 and a target voltage of the node 558. Comparator 590 may output the comparison signal to secondary side controller 554, secondary side controller 554 may output the comparison signal to transmitter 576, and transmitter 576 may transmit the comparison signal across the galvanic isolation barrier to receiver 578. Receiver 578 may send the comparison signal to the core circuitry 522 of adaptive primary side supply drive circuitry 506. Since the comparison signal indicates a factor of a difference between a present electrical characteristic of the node 558 and a target electrical characteristic of the node 558, the present signal may indicate the present electrical characteristic of the node 558.

In some examples, the comparison signal received by core circuitry 522 from the secondary side controller 554 represents a continuous time function or a discrete time function. This means that the electrical characteristics of the comparison signal may change as a function of time. Consequently, core circuitry 522 may continuously possess information indicative of a present electrical characteristic of the node 558, primary side controller 504 continuously processes the control signal in order to determine the future electrical characteristic of node 558 in real time, and primary side controller 504 continuously sends information indicative of the future electrical characteristic of node 558 to core circuitry 522. This means that core circuitry 522 may continuously possess information indicative of the future electrical characteristic of node 558.

Core circuitry 522 may determine, based on one or both of the future electrical characteristic of the node 558 and the present electrical characteristic of the node 558, whether to adjust one or more control signals for controlling the primary side gate driver 534 to drive the first semiconductor device 542. In some examples, the one or more future electrical characteristics of the node 558 include a future voltage at node 558, and the present electrical characteristic of the node 558 comprises a present voltage of the node 558. Core circuitry 522 may be configured to control one or more operating parameters of adaptive primary side supply drive circuitry 506 in order to drive the first semiconductor device 542. The one or more operating parameters may include a magnitude of a gate driver signal output from the primary side gate driver 534 to the first semiconductor device 542 and a frequency of the clock signal output from the primary side gate driver 534 to the first semiconductor device 542.

Core circuitry 522 may control adaptive primary side supply drive circuitry 506 to drive the first semiconductor device 542. In the example of FIG. 5, adaptive primary side supply drive circuitry 506 comprises core circuitry, pulse generator control circuitry 524, pulse handling circuitry 528, primary side gate driver 534, and comparator 538. To control other components of adaptive primary side supply drive circuitry 506, core circuitry 522 may cause pulse generator control circuitry 524 to output one or more clock pulses according to a clock cycle pulse handling circuitry 528. Pulse handling circuitry 528 may receive the clock pulses and generate a gate driver signal comprising a duty cycle for driving primary side gate driver 534. Subsequently, primary side gate driver 534 may output the gate driver signal in order to control first semiconductor device 542 to turn off and turn on according to a sequence of switching cycles. The clock signals output by pulse generator control circuitry may determine a frequency, duty cycle, and amplitude of the gate driver signal output by primary side gate driver 534.

Comparator 538 may sense a value of an electrical characteristic of shunt boost 540 (e.g., a voltage or a current) and compare the sensed electrical characteristic of shunt boost 540 to a predetermined electrical characteristic (e.g., a peak current threshold). In response to determining that the sensed value of the electrical characteristic of shunt boost 540 exceeds the predetermined threshold, pulse handling circuitry 528 may disable output of the gate driver signal, thereby disabling the adaptive primary side supply drive circuitry 506 for the duration of the clock cycle to transfer the electrical power stored at inductor 543 to a secondary side of the power converter.

Primary side controller 504 includes miscellaneous diagnostics (MISC DIAG) circuitry 518. MISC DIAG circuitry 518 enables controller 501 to output, via diagnostics output pins, diagnostic information to a user. In some examples, life sign handling circuitry 520 of primary side controller 504 receives a periodic life sign control message from secondary side controller 554. In the event that life sign handling circuitry 520 fails to receive a scheduled life sign control message from secondary side controller 554, life sign handling circuitry 520 determines that a fault exists in a communication channel between primary side controller 504 and secondary side controller 554.

In some examples, secondary side controller 554 sends feedback information based on the sensed electrical characteristic of node 558 in the form of a control message specifying a power mode according to which primary side controller 504 is to control adaptive primary side supply drive circuitry 506. Primary side controller 504 may receive a control message from secondary side controller 554. Primary side controller 504 controls, according to the power mode specified by the control message, adaptive primary side supply drive circuitry 506 to drive an output of buck-boost converter 521, which in turn drives a value of the electrical characteristic of node 558 to achieve a target value of the electrical characteristic of node 558.

Secondary side flyback detection circuitry 556 senses an electrical characteristic of node 558. In some examples, the electrical characteristic of node 558 is a voltage or a current. As depicted in the example of FIG. 5, secondary side flyback detection circuitry 556 comprises secondary side gate driver 588 and a number "N" of comparators 590, where N may be any number. Secondary side gate driver 588 outputs a high voltage signal to secondary side load (e.g., secondary side load 360 of FIG. 3. Comparators 590 sense a value of an electrical characteristic of node 558 of flyback power converter system 500 and compare the sensed node 558 to N predetermined thresholds 537. Comparators 590 output the resultant comparison to flyback control request 586 of secondary side controller 554. In some examples, comparators 590 comprise 2 comparators (e.g., a first comparator 590 and a second comparator 590), and predetermined thresholds 537 comprise a first predetermined threshold and a second predetermined threshold. In some examples, the first predetermined threshold is selected from a range of greater than or equal to about 95% to less than or equal to about 99.5% of a target value of the sensed electrical characteristic. In some examples, the first predetermined threshold is 98% of the target value of the sensed electrical characteristic. In some examples, the second predetermined threshold is selected from a range of greater than or equal to about 100% to less than or equal to about 105% of the target value of the sensed electrical characteristic. In some examples, the second predetermined threshold is 101% of the target value of the sensed electrical characteristic. The first comparator 590 compares the sensed value of the electrical characteristic to the first predetermined threshold and the second comparator 590 compares the sensed value of the electrical characteristic to the second predetermined threshold.

Flyback control request 586 of secondary side controller 554 determines, based on the output of comparators 590, whether a change is required to a power mode according to which primary side controller 504 controls adaptive primary side supply drive circuitry 506. In some examples, primary side controller 504 may control adaptive primary side supply drive circuitry 506 according to a high power mode, a low power mode, or a cycle skip power mode. For example, in response to receiving a signal from comparators 590 indicating that a sensed value of the electrical characteristic of node 558 is less than the first predetermined threshold (e.g., less than a minimum target value), flyback control request 586 determines to switch adaptive primary side supply drive circuitry 506 to operation according to the high power mode. As another example, in response to receiving a signal from comparators 590 indicating that a sensed value of the electrical characteristic of node 558 is greater than the second predetermined threshold (e.g., greater than a maximum target value), flyback control request 586 determines to switch adaptive primary side supply drive circuitry 506 to operation according to the cycle skip power mode. As another example, in response to receiving a signal from comparators 590 indicating that a sensed value of the electrical characteristic of node 558 is transitioning from greater than the second predetermined threshold to less than or equal to the second predetermined threshold (e.g., the sensed value is falling below the maximum target value), flyback control request 586 determines to switch adaptive primary side supply drive circuitry 506 to operation according to the low power mode.

In response to determining that a change is required to the power mode according to which primary side controller 504 controls adaptive primary side supply drive circuitry 506, flyback control request 586 passes a request for a change to the selected power mode to diagnosis feedback circuit 584, and diagnosis feedback circuit 584 combines the request for a change to the selected power mode with other diagnostic and/or feedback information from secondary side circuit 552, such as desaturation information, overcurrent protection (OCP) data, node 558 monitoring ("outmon"), under voltage indicators, overvoltage indicators, etc. Coreless Transmitter (CT) data transmitter 576 formulates the request for a change to the selected power mode and diagnostic information into a control message comprising a header frame, the selected power mode, diagnostic information, and a checksum. CT data transmitter 576 transmits, via a communication channel, a control message to a CT data receiver 578 of primary side circuit 502.

Primary side controller 504 receives, over a communication channel, a control message from secondary side controller 554 and controls, according to the power mode specified by the control message, adaptive primary side supply drive circuitry 506 to drive first semiconductor device 542. For example, CT data receiver 578 receives, via a communication channel, a control message from a CT data transmitter 576 of secondary side circuit 552. CT data receiver 578 provides a control message, including the specified power mode, to primary side controller 504.

To control adaptive primary side supply drive circuitry 506, driver handling circuitry 516 causes pulse generator control circuitry 524 to output one or more clock pulses according to a clock cycle to pulse handling circuitry 528. Pulse handling circuitry 528 receives clock pulses 410 and generates an output signal comprising a duty cycle for driving primary side gate driver 534, which turns on first semiconductor device 542 to generate energy within a first winding 521A of the buck-boost converter 521.

For example, during a clock cycle of primary side controller 504, driver handling circuitry 516 enables pulse handling circuitry 528 of adaptive primary side supply drive circuitry 506 so as to store electrical power within first winding 521A of flyback power converter system 500. Comparator 538 senses a value of an electrical characteristic of shunt boost 540 (e.g., a voltage or a current) and compares the sensed value to a predetermined threshold (e.g., a peak current threshold). In response to determining that the sensed value of the electrical characteristic of shunt boost 540 exceeds the predetermined threshold, pulse handling circuitry 528 disables output of the PWM drive signal, thereby disabling adaptive primary side supply drive circuitry 506 for the duration of the clock cycle to transfer the electrical power stored at first winding 521A to node 558 on the secondary side of flyback power converter system 500.

In accordance with the techniques of the disclosure, driver handling circuitry 516 of primary side controller 504 identifies the power mode specified by a control message and controls adaptive primary side supply drive circuitry 506 according to the specified power mode. For example, to control adaptive primary side supply drive circuitry 506 according to the low power mode, driver handling circuitry 516 outputs one or more clock pulses to pulse generator control circuitry 524, which cause pulse generator control circuitry 524 to output a first drive signal comprising a first amplitude to pulse handling circuitry 528. The first drive signal causes pulse handling circuitry 528 to output a first drive signal to primary side gate driver 534 comprising a first duty cycle duration.

As another example, to control adaptive primary side supply drive circuitry 506 according to the high power mode, driver handling circuitry 516 outputs one or more clock pulses to pulse generator control circuitry 524, which cause pulse generator control circuitry 524 to output a second drive signal comprising a second amplitude greater than the first amplitude to pulse handling circuitry 528. The second drive signal causes pulse handling circuitry 528 to output a second drive signal to primary side gate driver 534 comprising a second duty cycle duration longer than the first duty cycle duration.

As another example, to control adaptive primary side supply drive circuitry 506 according to the cycle skip power mode, driver handling circuitry 516 skips output of the one or more clock pulses for one or more clock cycles, which cause pulse generator control circuitry 524 to skip output of a drive signal, which in turn causes pulse handling circuitry 528 to skip output of a drive signal to primary side gate driver 534. This in turn causes primary side gate driver 534 to not charge energy for the duration of the time adaptive primary side supply drive circuitry 506 operates according to the cycle skip power mode.

Primary side controller 504 may select the amplitude of the drive signal (e.g., an amplitude output by pulse generator control circuitry 524) for the low power mode or the high power mode by tuning the selection of an $I_{PK}$ switch-off value set by comparators 538. Comparators 538 compare a voltage across shunt boost 540. Flyback power converter system 500 may include a different shunt flyback for each power mode implemented by adaptive primary side supply drive circuitry 506 so as to allow different $I_{PK}$ switch-off values for different power modes. For example, the high power mode may allow a relatively higher k current while the low power mode may allow a relatively lower $I_{PK}$ current. Thus, the output of comparators 538 serve to effectively increase or decrease the duration of the drive signal that pulse handling circuitry 528 outputs to primary side gate driver 534.

Flyback error handling circuitry 526 may identify errors in the primary side operation of flyback power converter system 500. Self-test and soft-start circuitry 523 enables adaptive primary side supply drive circuitry 506 to operate according to a safe power mode when communication with secondary side circuit 552 is lost. For example, adaptive primary side supply drive circuitry 506 may operate according to the safe power mode (also referred to herein as a "soft start" power mode) upon power-on of controller 501, in response to detecting a fault in a communication channel, or in response to a fault in secondary side circuit 552. The safe power mode may comprise one of a reduced power output or a reduced frequency of operation of adaptive primary side supply drive circuitry 506. Adaptive primary side supply drive circuitry 506 may operate according to the safe power mode without feedback control from secondary side controller 554.

Figure 6:
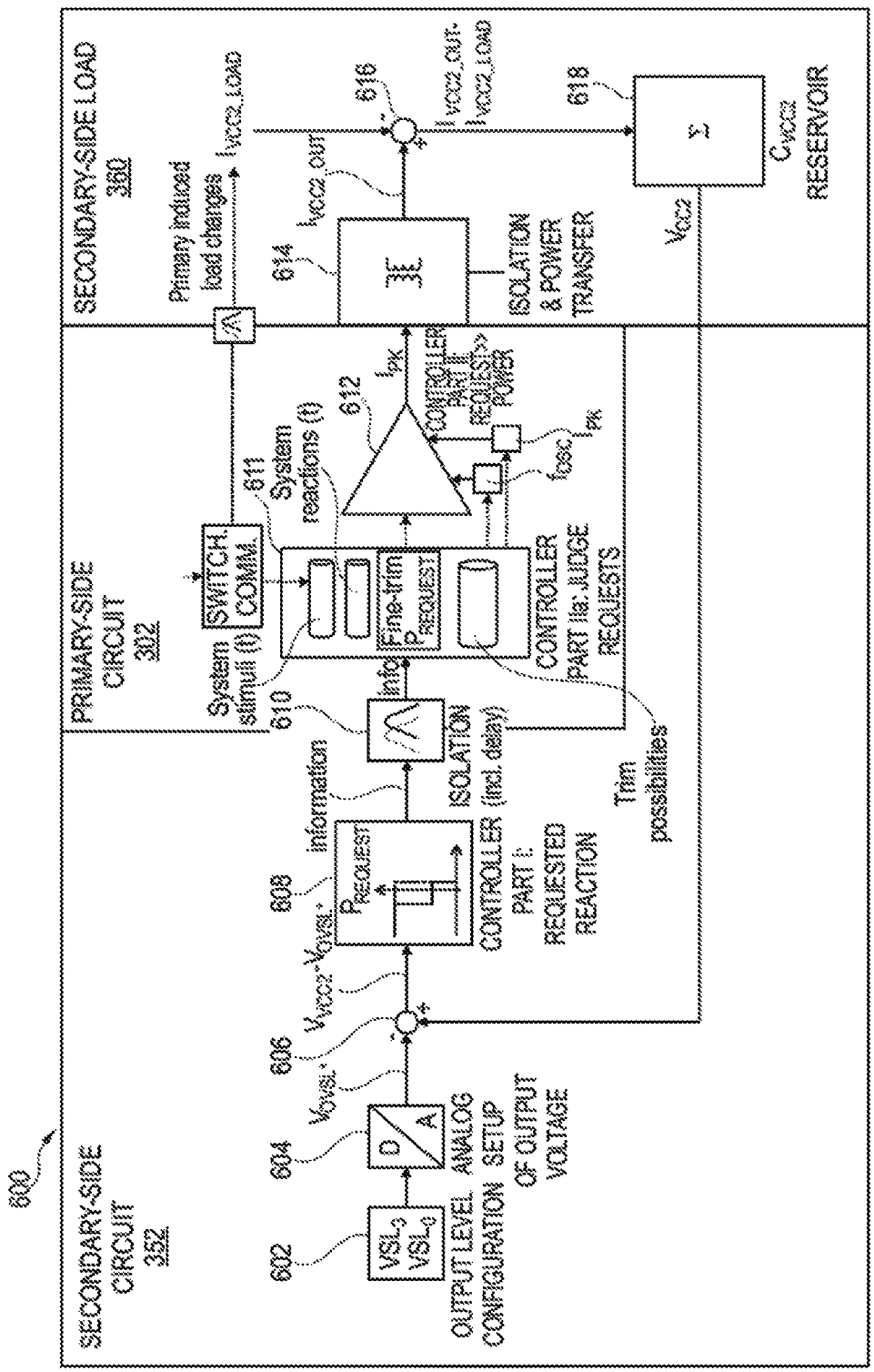
FIG. 6 is a block diagram illustrating an example control loop of a controller for a power converter system in accordance with the techniques of the disclosure.

FIG. 6 is a block diagram illustrating an example control loop of a controller for a power converter system in accordance with the techniques of the disclosure. For convenience, FIG. 6 is described with respect to the power converter system 300 of FIG. 3.

A user configures the desired value of an electrical characteristic of node 358 (602). In some examples, the desired value is a target value for a voltage of node 358 or a target value for a current of node 358. The desired value of node 358 is converted to predetermined thresholds for use by comparators 236 (604). In some examples, the desired value of node 358 is converted to a first comparator voltage (corresponding to a first predetermined threshold) and a second comparator voltage (corresponding to a second predetermined threshold).

Secondary side controller 354 determines a difference between a sensed value of the electrical characteristic of node 358 and the target value for the electrical characteristic (606). In some examples, the difference is a voltage difference between a sensed voltage of node 358 and a target voltage for node 358.

Secondary side controller 354 derives, from the voltage difference, a power request feedback (608). For example, secondary side controller 354 selects a power mode according to which primary side controller 304 controls adaptive primary side supply drive circuitry 306. Secondary side controller 354 transmits, over a communication channel, a control message specifying the selected power mode (610). In some examples, the communication channel is a digital transmission channel. In some examples, a control message additionally includes error correction and signal loss detection data.

Primary side circuit 302 is configured to receive a control signal having one or more electrical characteristics. Primary side circuit 302 is configured to process the control signal and identify a future electrical characteristic of node 358 based on the control signal. Primary side circuit 302 is configured to determine, based on the sensed present value of the electrical characteristic of node 358 and the identified future electrical characteristic of node 358, whether to adjust one or more parameters for controlling adaptive primary side supply drive circuitry 306 to drive flyback converter 321 (611).

Primary side controller 304 controls adaptive primary side supply drive circuitry 306 according to the specified power mode (612). In some examples, primary side controller 304 may additionally control adaptive primary side supply drive circuitry 306 according to other types of information, such as a configurable flyback switching frequency ($f_{OSC}$) or a configurable peak current ($I_{PK}$).

Secondary side load 360 may include, e.g., external circuitry 614, which may take the form of a transformer and/or rectifying diodes. A difference 616 of an output current and a load current delivered to secondary side load 360 is stored in external buffer 618 (e.g., a buffer cap), which adjusts the value of the electrical characteristic of node 358, closing the feedback loop of flyback power converter system 300.

Figure 7:
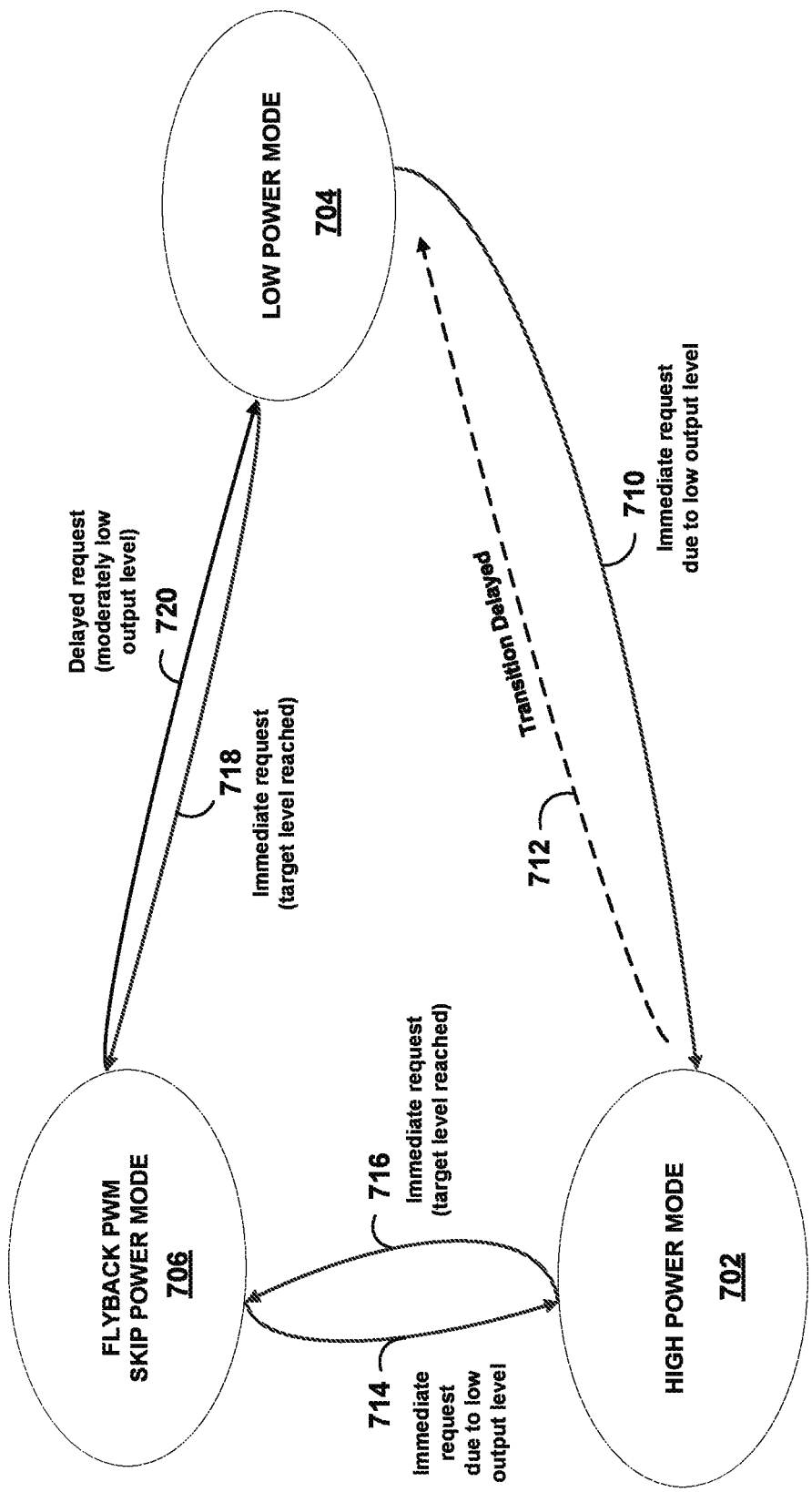
FIG. 7 is a block diagram illustrating an example state diagram for a controller for the flyback power converter system of FIG. 3 during operation according to different power modes in accordance with the techniques of the disclosure.

FIG. 7 is a block diagram illustrating an example state diagram for a controller for the flyback power converter system of FIG. 3 during operation according to different power modes in accordance with the techniques of the disclosure. In the example of FIG. 7, secondary side controller 354 selects one of a low power mode, a high power mode, or a cycle skip power mode according to which primary side controller 304 is to adaptive primary side supply drive circuitry 306. However, in other examples, secondary side controller 354 may use more than 3 power modes.

As illustrated in the example of FIG. 7, secondary side controller 354 causes primary side controller 304 to transition from controlling adaptive primary side supply drive circuitry 306 according to high-power mode 702 to controlling adaptive primary side supply drive circuitry 306 according to skip power mode 706 in response to secondary side controller 354 determining that a sensed electrical characteristic of node 358 has reached a maximum target value (716). Further, secondary side controller 354 causes primary side controller 304 to transition from controlling adaptive primary side supply drive circuitry 306 according to skip power mode 706 to controlling adaptive primary side supply drive circuitry 306 according to high power mode 702 in response to secondary side controller 354 determining that the sensed electrical characteristic of node 358 has reached a minimum target value (714).

As another example, secondary side controller 354 causes primary side controller 304 to transition from controlling adaptive primary side supply drive circuitry 306 according to low-power mode 704 to controlling adaptive primary side supply drive circuitry 306 according to skip power mode 706 in response to secondary side controller 354 determining that the sensed electrical characteristic of node 358 has reached the maximum target value (718). Secondary side controller 354 causes primary side controller 304 to transition from controlling adaptive primary side supply drive circuitry 306 according to skip power mode 706 to controlling adaptive primary side supply drive circuitry 306 according to low power mode 704 in response to secondary side controller 354 determining that the sensed electrical characteristic of node 358 has fallen below the maximum target value (720).

In some examples, since primary side controller 304 may receive a control signal and predict a future electrical characteristic of node 358, primary side controller 304 may transition from controlling adaptive primary side supply drive circuitry 306 according to skip power mode 706 to controlling adaptive primary side supply drive circuitry 306 according to low power mode 704 faster than one or more systems that do not predict a future characteristic of a node at the secondary side output. For example, primary side controller 304 and/or secondary side controller 354 may determine that the sensed electrical characteristic of node 358 will fall below the maximum target value in the future based on the future electrical characteristic of node 358.

In some examples, transition 714 may occur when secondary side controller 354 detects a fast drop of the sensed electrical characteristic of node 358. In some examples, transition 714, or transition 720 followed by transition 710, may occur when secondary side controller 354 depending on the sensed electrical characteristic of node 358 dropping below the minimum target level. For example, transition 714, or transition 720 followed by transition 710, may occur depending on a rate that the sensed electrical characteristic of node 358 drops below the minimum target level (e.g., relatively quickly or relatively slowly).

As another example, secondary side controller 354 causes primary side controller 304 to transition from controlling adaptive primary side supply drive circuitry 306 according to low-power mode 704 to controlling adaptive primary side supply drive circuitry 306 according to high power mode 702 in response to secondary side controller 354 determining that the sensed electrical characteristic of node 358 has fallen below the minimum target value (710).

In contrast, typically, primary side controller 304 may delay transitioning adaptive primary side supply drive circuitry 306 from operation according to high power mode 702 to operation according to low power mode 704 (712) because delaying the transition from high power mode 702 to low power mode 704 may instead be preferable in order to accurately decrease the electrical characteristic of node 358 from the maximum target level. In some examples, one or more parameters of the transition of adaptive primary side supply drive circuitry 306 from operation according to high power mode 702 to operation according to low power mode 704 may be user-programmable. For example, a time that it takes to transition from the high power mode 702 to the low power mode 704 may be user programmable.

As an illustration of the above, secondary side controller 354 senses an electrical characteristic of node 358. The electrical characteristic of node 358 may be, e.g., a voltage or a current of node 358. Secondary side controller 354 compares a value of the sensed electrical characteristic of node 358 to a first predetermined threshold and a second predetermined threshold. In some examples, the first predetermined threshold is selected from a range of greater than or equal to about 95% to less than or equal to about 99.5% of a target value of the sensed electrical characteristic. In some examples, the first predetermined threshold is 98% of the target value of the sensed electrical characteristic. In some examples, the second predetermined threshold is selected from a range of greater than or equal to about 100% to less than or equal to about 105% of the target value of the sensed electrical characteristic. In some examples, the second predetermined threshold is 101% of the target value of the sensed electrical characteristic.

In response to determining that the value of the sensed electrical characteristic is less than the first predetermined threshold (e.g., the sensed electrical characteristic of node 358 is less than a minimum target value), secondary side controller 354 selects high power mode 702 to increase the sensed electrical characteristic to the minimum target value. In response to determining that the value of the sensed electrical characteristic is greater than the second predetermined threshold (e.g., the sensed electrical characteristic of node 358 is greater than a maximum target value), secondary side controller 354 selects skip power mode 706 to reduce the sensed electrical characteristic to the maximum target value. In response to determining that the value of the sensed electrical characteristic is transitioning from greater than the second predetermined threshold to less than or equal to the second predetermined threshold (e.g., the sensed electrical characteristic of node 358 exceeded the maximum target value and has fallen to below the maximum target value), secondary side controller 354 selects low power mode 704.

Figure 8:
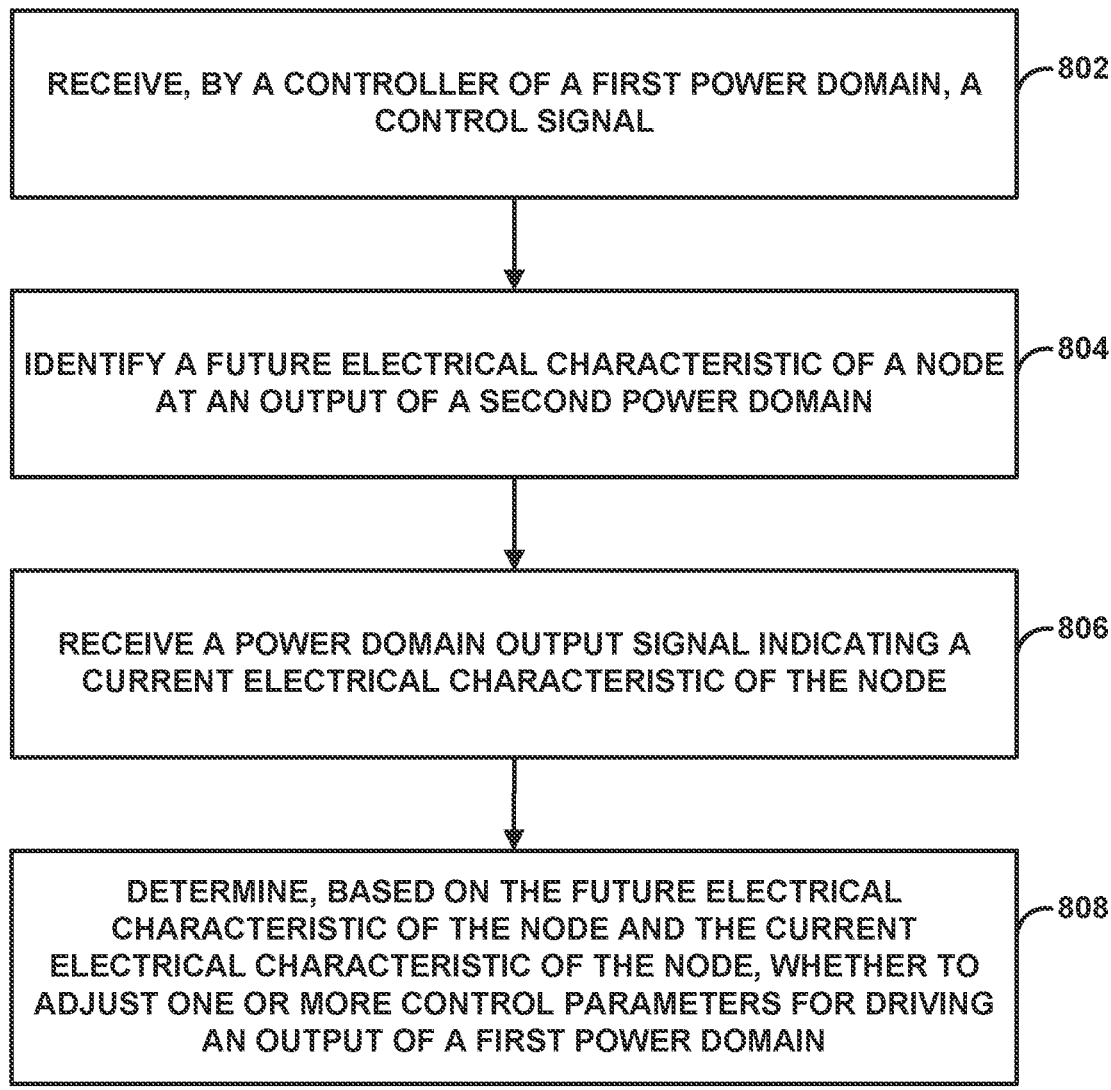
FIG. 8 is a flow diagram illustrating an example operation for predicting a future electrical characteristic of a high side output node in order to drive a low side output, in accordance with one or more techniques of this disclosure.

FIG. 8 is a flow diagram illustrating an example operation for predicting a future electrical characteristic of a high side output node in order to drive a low side output, in accordance with one or more techniques of this disclosure. FIG. 8 is described with respect to power converter system 100 of FIG. 1. However, the techniques of FIG. 8 may be performed by different components of power converter system 100 or by additional or alternative systems.

Low side controller 104 may receive a control signal (802). In some examples, the control signal may be for controlling high side driver circuitry 156 to regulate an output node (e.g., node 158) of the high side. The control signal may include one or more electrical characteristics that may indicate a future electrical characteristic of node 158. Consequently, low side controller 104 may be configured to identify the future electrical characteristic of the node 158 based on the control signal (804). In some examples, low side controller 104 may send the control signal to high side controller 154 when low side controller 104 in response to determining the future characteristic of node 158. High side controller 154 may control the high side driver circuitry 156 to drive a semiconductor device on the high side of the power converter. This may control the electrical characteristic of node 158.

Low side controller 104 may forward information indicative of the future electrical characteristic of node 158 to adaptive low side supply drive circuitry 106. Adaptive low side supply drive circuitry 106 may receive a power domain output signal indicating a present electrical characteristic of the node 158 (806). For example, high side DC/DC sense & control circuitry 157 may sense the present electrical characteristic of the node 158. High side DC/DC sense & control circuitry 157 may send the present electrical characteristic of the node 158 to adaptive low side supply drive circuitry 106. Adaptive low side supply drive circuitry 106 may determine, based on the future electrical characteristic of node 158 and the current electrical characteristic of node 158, whether to adjust one or more control parameters for driving an output of high side DC/DC supply 120 (808).

The following numbered clauses may demonstrate one or more aspects of the disclosure.

Clause 1: A circuit for controlling a power converter, the circuit comprising: a first power domain circuit including a first control circuit and a first driver circuit, wherein the first control circuit controls the first driver circuit to drive a first semiconductor device of the power converter, wherein a second power domain circuit includes a second control circuit and a second driver circuit, wherein the first power domain circuit is isolated from the second power domain circuit. The first control circuit is configured to: receive a control signal for controlling the second driver circuit to drive a second semiconductor device of the power converter; identify, based on the control signal, a future electrical characteristic of a second power domain output of the power converter; and determine, based on the future electrical characteristic of the second power domain output of the power converter, whether to adjust one or more control parameters for controlling the first driver circuit to drive the first semiconductor device.

Clause 2: The circuit of clause 1, wherein the first control circuit is further configured to send the control signal to the second control circuit, and wherein the second control circuit is configured to control the second driver circuit to drive the second semiconductor device based on the control signal.

Clause 3: The circuit of any of clauses 1-2, wherein the first control circuit is further configured to: receive, from the second control circuit, a second power domain output signal indicating a present electrical characteristic of the second power domain output of the power converter; and determine, based on the future electrical characteristic of the second power domain output and the present electrical characteristic of the second power domain output, whether to adjust the one or more control parameters for controlling the first driver circuit to drive the first semiconductor device.

Clause 4: The circuit of any of clauses 1-3, wherein in response to identifying the future electrical characteristic of the second power domain output, the first control circuitry is configured to: predict a future change in the second power domain output; and adjust the one or more control parameters for controlling the first driver circuit to drive the first semiconductor device based on the predicted future change in the second power domain output.

Clause 5: The circuit of any of clauses 1-4, wherein based on determining to adjust the one or more control parameters for controlling the first driver circuit to drive the first semiconductor device, the first control circuit is configured to perform one or both of adjust a magnitude of a parameter of a clock signal output from the first driver circuit to the first semiconductor device; and adjust a frequency of the clock signal output from the first driver circuit to the first semiconductor device.

Clause 6: The circuit of any of clauses 1-5, wherein the power converter comprises a Direct Current-to-Direct Current (DC/DC) power converter.

Clause 7: The circuit of any of clauses 1-6, wherein the power converter comprises a flyback power converter.

Clause 8: The circuit of any of clauses 1-7, wherein the power converter is configured to operate according to a plurality of power modes including at least a low power mode, a high power mode, and a cycle skip power mode.

Clause 9: The circuit of clause 8, wherein second control circuit is configured to: sense an electrical characteristic of the second power domain output; select, based on the sensed electrical characteristic, a power mode of the plurality of power modes; and transmit, to the first control circuit, a control message specifying the selected power mode, and wherein the first control circuit is further configured to: receive, from the second control circuit, the control message specifying the selected power mode.

Clause 10: The circuit of clause 9, wherein to select the power mode of the plurality of power modes, the second control circuitry is configured to: in response to determining that a value of the sensed electrical characteristic is less than a first predetermined threshold, select the high power mode; in response to determining that the value of the sensed electrical characteristic is transitioning from greater than a second predetermined threshold to less than or equal to the second predetermined threshold, select the low power mode; and in response to determining that the value of the sensed electrical characteristic is greater than the second predetermined threshold, select the cycle skip power mode.

Clause 11: The circuit of clause 10, wherein the first control circuitry is configured to control the first driver circuit to drive the first semiconductor device of the power converter according to the selected power mode in order to control the electrical characteristic of the second power domain output.

Clause 12: A method comprising: receiving, by a first control circuit of a first power domain circuit, a control signal for controlling a second driver circuit of a second power domain circuit to drive a second semiconductor device of the power converter, wherein the first control circuit controls a first driver circuit of the first power domain circuit to drive a first semiconductor device of the power converter, wherein the second power domain circuit includes a second control circuit, and wherein the first power domain circuit is isolated from the second power domain circuit; identifying, by the first control circuit based on the control signal, a future electrical characteristic of a second power domain output of the power converter; and determining, by the first control circuit based on the future electrical characteristic of the second power domain output of the power converter, whether to adjust one or more control parameters for controlling the first driver circuit to drive the first semiconductor device.

Clause 13: The method of clause 12, further comprising: sending, by the first control circuit, the control signal to the second control circuit, and controlling, by the second control circuit, the second driver circuit to drive the second semiconductor device based on the control signal.

Clause 14: The method of any of clauses 12-13, further comprising: receiving, by the first control circuit from the second control circuit, a second power domain output signal indicating a present electrical characteristic of the second power domain output of the power converter; and determining, by the first control circuit based on the future electrical characteristic of the second power domain output and the present electrical characteristic of the second power domain output, whether to adjust the one or more control parameters for controlling the first driver circuit to drive the first semiconductor device.

Clause 15: The method of any of clauses 12-14, wherein in response to identifying the future electrical characteristic of the second power domain output, the method further comprises: predicting, by the first control circuitry, a future change in the second power domain output; and adjusting, by the first control circuitry, the one or more control parameters for controlling the first driver circuit to drive the first semiconductor device based on the predicted future change in the second power domain output.

Clause 16: The method of any of clauses 12-15, wherein based on determining to adjust the one or more control parameters for controlling the first driver circuit to drive the first semiconductor device, method further comprises one or both of: adjusting, by the first control circuit, a magnitude of a parameter of a clock signal output from the first driver circuit to the first semiconductor device; and adjusting, by the first control circuit, a frequency of the clock signal output from the first driver circuit to the first semiconductor device.

Clause 17: The method of any of clauses 12-16, wherein the power converter is configured to operate according to a plurality of power modes including at least a low power mode, a high power mode, and a cycle skip power mode.

Clause 18: The method of clause 17, further comprising: sensing, by the second control circuit, an electrical characteristic of the second power domain output; selecting, by the second control circuit based on the sensed electrical characteristic, a power mode of the plurality of power modes; and transmitting, by the second control circuit to the first control circuit, a control message specifying the selected power mode, and receiving, by the first control circuit from the second control circuit, the control message specifying the selected power mode.

Clause 19: The method of clause 18, wherein selecting the power mode of the plurality of power modes comprises: in response to determining that a value of the sensed electrical characteristic is less than a first predetermined threshold, selecting the high power mode; in response to determining that the value of the sensed electrical characteristic is transitioning from greater than a second predetermined threshold to less than or equal to the second predetermined threshold, selecting the low power mode; and in response to determining that the value of the sensed electrical characteristic is greater than the second predetermined threshold, selecting the cycle skip power mode.

Clause 20: A system comprising: a power converter; and a circuit for controlling the power converter, the circuit comprising: a first power domain circuit including a first control circuit and a first driver circuit, wherein the first control circuit controls the first driver circuit to drive a first semiconductor device of the power converter, wherein a second power domain circuit includes a second control circuit and a second driver circuit, wherein the first power domain circuit is isolated from the second power domain circuit, and wherein the first control circuit is configured to: receive a control signal for controlling the second driver circuit to drive a second semiconductor device of the power converter; identify, based on the control signal, a future electrical characteristic of a second power domain output of the power converter; and determine, based on the future electrical characteristic of the second power domain output of the power converter, whether to adjust one or more control parameters for controlling the first driver circuit to drive the first semiconductor device.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A circuit for controlling a power converter, the circuit comprising:
a first power domain circuit including a first control circuit and a first driver circuit, wherein the first control circuit controls the first driver circuit to drive a first semiconductor device of the power converter, wherein a second power domain circuit includes a second control circuit and a second driver circuit, wherein the first power domain circuit is isolated from the second power domain circuit, and wherein the first control circuit is configured to:

receive a control signal for controlling the second driver circuit to drive a second semiconductor device of the power converter;

identify, based on the control signal, a future electrical characteristic of a second power domain output of the power converter; and determine, based on the future electrical characteristic of the second power domain output of the power converter, whether to adjust one or more control parameters for controlling the first driver circuit to drive the first semiconductor device.

2. The circuit of claim 1,
wherein the first control circuit is further configured to send the control signal to the second control circuit, and
wherein the second control circuit is configured to control the second driver circuit to drive the second semiconductor device based on the control signal.

3. The circuit of claim 1, wherein the first control circuit is further configured to:
receive, from the second control circuit, a second power domain output signal indicating a present electrical characteristic of the second power domain output of the power converter; and
determine, based on the future electrical characteristic of the second power domain output and the present electrical characteristic of the second power domain output, whether to adjust the one or more control parameters for controlling the first driver circuit to drive the first semiconductor device.

4. The circuit of claim 1, wherein in response to identifying the future electrical characteristic of the second power domain output, the first control circuitry is configured to:
predict a future change in the second power domain output; and
adjust the one or more control parameters for controlling the first driver circuit to drive the first semiconductor device based on the predicted future change in the second power domain output.

5. The circuit of claim 1, wherein based on determining to adjust the one or more control parameters for controlling the first driver circuit to drive the first semiconductor device, the first control circuit is configured to perform one or both of:
adjust a magnitude of a parameter of a clock signal output from the first driver circuit to the first semiconductor device; and
adjust a frequency of the clock signal output from the first driver circuit to the first semiconductor device.

6. The circuit of claim 1, wherein the power converter comprises a Direct Current-to-Direct Current (DC/DC) power converter.

7. The circuit of claim 1, wherein the power converter comprises a flyback power converter.

8. The circuit of claim 1, wherein the power converter is configured to operate according to a plurality of power modes including at least a low power mode, a high power mode, and a cycle skip power mode.

9. The circuit of claim 8, wherein second control circuit is configured to:
sense an electrical characteristic of the second power domain output;
select, based on the sensed electrical characteristic, a power mode of the plurality of power modes; and
transmit, to the first control circuit, a control message specifying the selected power mode, and
wherein the first control circuit is further configured to:
receive, from the second control circuit, the control message specifying the selected power mode.

10. The circuit of claim 9, wherein to select the power mode of the plurality of power modes, the second control circuitry is configured to:
in response to determining that a value of the sensed electrical characteristic is less than a first predetermined threshold, select the high power mode;
in response to determining that the value of the sensed electrical characteristic is transitioning from greater than a second predetermined threshold to less than or equal to the second predetermined threshold, select the low power mode; and
in response to determining that the value of the sensed electrical characteristic is greater than the second predetermined threshold, select the cycle skip power mode.

11. The circuit of claim 10, wherein the first control circuitry is configured to control the first driver circuit to drive the first semiconductor device of the power converter according to the selected power mode in order to control the electrical characteristic of the second power domain output.

12. A method comprising:
receiving, by a first control circuit of a first power domain circuit, a control signal for controlling a second driver circuit of a second power domain circuit to drive a second semiconductor device of the power converter, wherein the first control circuit controls a first driver circuit of the first power domain circuit to drive a first semiconductor device of the power converter, wherein the second power domain circuit includes a second control circuit, and wherein the first power domain circuit is isolated from the second power domain circuit;
identifying, by the first control circuit based on the control signal, a future electrical characteristic of a second power domain output of the power converter; and
determining, by the first control circuit based on the future electrical characteristic of the second power domain output of the power converter, whether to adjust one or more control parameters for controlling the first driver circuit to drive the first semiconductor device.

13. The method of claim 12, further comprising:
sending, by the first control circuit, the control signal to the second control circuit, and
controlling, by the second control circuit, the second driver circuit to drive the second semiconductor device based on the control signal.

14. The method of claim 12, further comprising:
receiving, by the first control circuit from the second control circuit, a second power domain output signal indicating a present electrical characteristic of the second power domain output of the power converter; and
determining, by the first control circuit based on the future electrical characteristic of the second power domain output and the present electrical characteristic of the second power domain output, whether to adjust the one or more control parameters for controlling the first driver circuit to drive the first semiconductor device.

15. The method of claim 12, wherein in response to identifying the future electrical characteristic of the second power domain output, the method further comprises:
predicting, by the first control circuitry, a future change in the second power domain output; and
adjusting, by the first control circuitry, the one or more control parameters for controlling the first driver circuit to drive the first semiconductor device based on the predicted future change in the second power domain output.

16. The method of claim 12, wherein based on determining to adjust the one or more control parameters for controlling the first driver circuit to drive the first semiconductor device, method further comprises one or both of:
- adjusting, by the first control circuit, a magnitude of a parameter of a clock signal output from the first driver circuit to the first semiconductor device; and
- adjusting, by the first control circuit, a frequency of the clock signal output from the first driver circuit to the first semiconductor device.

17. The method of claim 12, wherein the power converter is configured to operate according to a plurality of power modes including at least a low power mode, a high power mode, and a cycle skip power mode.

18. The method of claim 17, further comprising:
- sensing, by the second control circuit, an electrical characteristic of the second power domain output;
- selecting, by the second control circuit based on the sensed electrical characteristic, a power mode of the plurality of power modes; and
- transmitting, by the second control circuit to the first control circuit, a control message specifying the selected power mode, and
- receiving, by the first control circuit from the second control circuit, the control message specifying the selected power mode.

19. The method of claim 18, wherein selecting the power mode of the plurality of power modes comprises:
- in response to determining that a value of the sensed electrical characteristic is less than a first predetermined threshold, selecting the high power mode;
- in response to determining that the value of the sensed electrical characteristic is transitioning from greater than a second predetermined threshold to less than or equal to the second predetermined threshold, selecting the low power mode; and
- in response to determining that the value of the sensed electrical characteristic is greater than the second predetermined threshold, selecting the cycle skip power mode.

20. A system comprising:
- a power converter; and
- a circuit for controlling the power converter, the circuit comprising:
  - a first power domain circuit including a first control circuit and a first driver circuit, wherein the first control circuit controls the first driver circuit to drive a first semiconductor device of the power converter, wherein a second power domain circuit includes a second control circuit and a second driver circuit, wherein the first power domain circuit is isolated from the second power domain circuit, and wherein the first control circuit is configured to:
    - receive a control signal for controlling the second driver circuit to drive a second semiconductor device of the power converter;
    - identify, based on the control signal, a future electrical characteristic of a second power domain output of the power converter; and
    - determine, based on the future electrical characteristic of the second power domain output of the power converter, whether to adjust one or more control parameters for controlling the first driver circuit to drive the first semiconductor device.

* * * * *